(12) United States Patent
Otting et al.

(10) Patent No.: US 6,979,911 B2
(45) Date of Patent: Dec. 27, 2005

(54) METHOD AND APPARATUS FOR SOLAR POWER CONVERSION

(75) Inventors: William D. Otting, Westlake Village, CA (US); Charles T. Kudija, Jr., Santa Clarita, CA (US)

(73) Assignee: United Technologies Corporation, Hartford, CT (US)

( * ) Notice: Subject to any disclaimer, the term of this patent is extended or adjusted under 35 U.S.C. 154(b) by 158 days.

(21) Appl. No.: 10/434,311

(22) Filed: May 8, 2003

(65) Prior Publication Data

US 2004/0222636 A1 Nov. 11, 2004

(51) Int. Cl.[7] .................................. F03G 6/06
(52) U.S. Cl. .................. 290/1 R; 60/641.8; 60/641.15
(58) Field of Search ................ 290/1 R; 60/641.8, 60/641.11, 641.15, 641.18

(56) References Cited

U.S. PATENT DOCUMENTS

| | | | | | |
|---|---|---|---|---|---|
| 3,152,260 | A | * | 10/1964 | Cummiogs ................ 290/52 |
| 4,203,425 | A | * | 5/1980 | Clark ................ 126/625 |
| 4,296,731 | A | * | 10/1981 | Cluff ................ 126/578 |
| 4,335,578 | A | * | 6/1982 | Osborn et al. ........... 60/641.8 |
| 4,392,350 | A | * | 7/1983 | Marks ................ 60/518 |
| 4,452,047 | A | * | 6/1984 | Hunt et al. ............ 60/641.15 |
| 4,616,140 | A | * | 10/1986 | Bratt ................ 290/1 R |
| 4,707,990 | A | * | 11/1987 | Meijer ................ 60/641.15 |
| 4,723,411 | A | * | 2/1988 | Darooka et al. ........... 60/525 |
| 4,768,341 | A | * | 9/1988 | Nozaki et al. ............ 60/524 |
| 6,688,303 | B2 | * | 2/2004 | Davenport et al. ......... 126/570 |
| 6,735,946 | B1 | * | 5/2004 | Otting et al. ............ 60/641.11 |

FOREIGN PATENT DOCUMENTS

| | | | | | |
|---|---|---|---|---|---|
| EP | 163801 | A1 | * | 12/1985 | ......... F24J 2/12 |
| GB | 2125157 | A | * | 2/1984 | ......... F02G 1/043 |
| JP | 3286170 | A | * | 12/1991 | |

* cited by examiner

*Primary Examiner*—Joseph Waks
(74) *Attorney, Agent, or Firm*—Harness Dickey & Pierce P.L.C.

(57) ABSTRACT

A solar power conversion system using a plurality of engines to convert solar energy to electrical energy. The plurality of engines are supported adjacent to a housing having a single thermal cavity. The cavity is provided with solar energy from a solar collector. Each of the engines can be turned off or regulated to maintain an optimum operating temperature for a common heater head in communication with each of the engines. Therefore, the power conversion system can be regulated for variations in insolation to maintain an optimum temperature in the heater head. Therefore, increased life cycle energy efficiency of the power conversion system can be obtained.

11 Claims, 3 Drawing Sheets

FIG. 3

METHOD AND APPARATUS FOR SOLAR POWER CONVERSION

FIELD OF THE INVENTION

The present invention relates to energy conversion using concentrated solar energy and solar thermal receivers, and particularly relates to the heating of various heat engines with solar thermal receivers that are in turn heated by solar collectors and concentrators.

BACKGROUND OF THE INVENTION

The use of electricity has become more and more inclusive in modern times. Electricity is nearly ubiquitous in every day activities. Therefore producing the electricity used by modern societies is a never-ending task. Various forms of conversion are used to convert naturally occurring energy sources into electricity. One naturally occurring energy source is solar energy. Solar energy can be collected and concentrated, and then converted into electrical energy. Specifically, it is generally known in the field how to collect and concentrate solar energy to power various types of heat engines based on generally known power conversion cycles to produce electricity. The various common engines are often categorized according to the various thermodynamic cycles including Stirling cycle engines, Brayton cycle engines, and Rankine cycle engines. Other thermodynamic cycles and engines that implement them exist, and these can use the collected thermal energy, converting it into electrical energy for modern societies. To those skilled in the art, it will be clear that an increase in the efficiency of these processes will decrease the amount of heat resource needed to provide a given level of electrical energy.

A Stirling cycle engine is a thermal energy to mechanical energy conversion device that uses a piston assembly to divide a fixed amount of gas between at least two chambers. The chambers are otherwise connected by a fluid passage equipped with heat source, recuperation, and heat sink heat exchangers. The piston assembly has separate piston heads that act on both chambers simultaneously. As the volume in one chamber is increased, the volume in the other chamber decreases, and vice versa, though not strictly to the same degree since one of the piston heads can have a greater area than the other piston head by design. A movement of the piston assembly in either direction creates an elevation of pressure in the chamber that experiences a decrease in volume while the other chamber that experiences an increase in volume finds its pressure reduced. The pressure differential across the two chambers decelerates the pistons, and causes a flow of gas from one chamber to the other, through the connecting fluid passage with its heat exchangers. The heat exchangers tend to either amplify or attenuate the gas volume flowing through them, depending, respectively, on whether the gas is either heating or cooling as it flows through the fluid passage.

The character of the piston assembly as a finite massive moving object now comes into play according to the laws of motion and momentum. The piston will overshoot the point at which the pressure forces across the piston are in balance. Up to that point, the piston has had an accelerating pressure differential force that charges it with kinetic energy of motion. Once the net forces on the piston balance, the acceleration ceases, but the piston moves on at its maximum speed. Soon the pressure differential reverses and the piston decelerates, transferring its kinetic energy of motion into gas pressure/volume energy in the chamber toward which the piston has been moving up to this point. The increased pressure in the chamber now accelerates the piston in the opposite direction to the point where it reaches its maximum velocity in the opposite direction at the force balance point, and then decelerates as an increasing pressure differential builds in the other chamber. Once again, the piston stops, reverses direction, and repeats the process anew. This is a case of periodic motion as the energy is passed from the form of kinetic energy in the piston assembly to net pressure/volume energy in the chambers.

The periodic motion tends to be damped by small irreversibilities, especially the gas that is pumped back and forth from one chamber to the other through the fluid passage. This is the normal case for a Stirling engine in an isothermal state. However, when it is thermally linked to hot source and cool sink reservoirs at the source and sink heat exchangers respectively, the gas flowing into one of the chambers is heated while the gas flowing into the chamber on the other side is cooled. In this way, a given mass of pressurized cool gas sent to the hot chamber is heated and amplified in volume to a sizable shove. Conversely, a given mass of hot gas leaving the hot side chamber is reduced in volume as it is cooled by passage through the heat exchangers, and the cooled gas push in the cool side chamber is thereby attenuated dramatically due to the reduced volumetric flow of the cooler gas. Thereby, a change in the piston position, and its effects on gas temperature and pressure within the Stirling cycle engine, cause portions of the hot reservoir thermal energy to turn into periodic mechanical piston energy and gas pressure/volume energy, and the remaining thermal energy to flow to the cool reservoir in periodic fashion.

The compressible gas within the two chambers and the piston moving between those chambers form a spring-mass system that exhibit a natural frequency. Similarly, the motion of gas between the two chambers has its own natural frequency of a lower order. The conversion of thermal energy to mechanical within this system would cause such a system have successively higher amplitudes until mechanical interference or some other means of removing the energy appears. For many commercial Stirling cycle heat engine systems, a power piston operating at the same frequency, but out of phase with heat engine piston, is used to remove the excess mechanical energy and convert it into useful work.

One way to produce this energy conversion is to use the time varying position of the power piston to produce a time varying magnetic flux in an electrical conductor, producing thereby, an electromotive potential which can be consumed locally, or remotely over transmission lines, by connection to an electrical appliance such as a motor, battery charger, or heater. Commonly, this is done by using the power piston to drive an alternator mover through a mechanical link. The alternator mover is what converts a time varying position within the alternator into time varying magnetic flux in the alternator electrical conductor(s).

Although many sources can provide the heat to power the Stirling cycle engine, one particular source is solar energy in the form of collimated sunlight. When solar energy is used to drive a Stirling engine, the collimated sunlight is collected, typically by a mirror or mirror array, concentrated, typically by the curvature of the mirror surface or the orientation of the individual mirrors in an array, and absorbed in a small area, typically a cavity absorber. This absorber becomes hot after absorbing the collimated sunlight. The hot absorber is thermally coupled to the source heat exchanger described above.

For solar power systems, the solar energy from the sun is collected and concentrated onto an absorber. The absorbed optical energy provides a source of thermal energy to operate a power conversion cycle or heat engine, such as the Stirling engine. The temperature of the thermal energy at the absorber depends on the concentration ratio, the optical/absorber configuration, and the rate of heat removal to the heat engine and to the environment through losses. The solar energy is generally concentrated into an absorber cavity so that losses are minimized, and the thermal energy is then transferred to the source heat exchanger of a single Stirling cycle engine with minimal temperature loss.

Stirling cycle engines can be designed and tuned for optimal efficiency at various different temperatures for the source heat exchanger. Nevertheless, once a Stirling cycle engine is tuned or optimized for particular operating conditions its efficiency dramatically decreases when these optimum conditions are not maintained. If the concentrated sunlight entering the absorber cavity varies slightly, the efficiency of the single Stirling cycle engine can be compromised. Such variations can occur when only a slight haze or foggy condition exists between the concentrator and the sun. Moreover, time of day and seasonal variations can cause the sunlight to travel through more or less atmosphere and effect the insolation, thereby adversely affecting the concentrated solar power level to a value that is not consistent with operating the Stirling cycle engine at its optimum efficiency.

When the insolation becomes too low, the Stirling engine overcools the thermal cavity. At this point, the temperature of the thermal cavity is below the design temperature of the Stirling engine. This will result in a reduction in the heater head temperature causing the engine to operate at a lower efficiency point. Although, the design of the Stirling engine can be modified by adjusting the stroke length to partially compensate for this, the Stirling engine still may not operate at optimum or designed conditions. Therefore, over a long period of time, this inefficiency can have a significant impact on the life cycle cost of the units of energy produced.

Accordingly, there exists a need for a system that will allow for more efficient conversion of the collected and concentrated solar energy into electrical energy. More specifically, a power conversion system is needed that is flexible enough to allow it to be optimized for various and unique operating conditions so that its overall and long-term operating efficiency increases. Particularly, it is desired that a power conversion system be provided that is able to adapt and alter its operating configuration to optimize the operation of the system over a plurality of insolation levels.

SUMMARY OF THE INVENTION

Various embodiments of the present invention may utilize various and numerous power conversion engines to convert collected and concentrated solar energy into electrical energy. Again, various engines or cycles include the Stirling engine, the Brayton cycle engine, or Rankine cycle engine.

Various embodiments provide a solar power conversion system using a Stirling engine system that allows for optimization of the conversion of thermal and solar energy into electrical energy. Specifically, the system enables the collection of solar energy to be concentrated into a cavity to create a thermal source to heat a heater head of the system. This thermal source heats the heater head, or hot region, of the Stirling engine to provide the increased temperature required to operate the Stirling engine. A plurality of Stirling engines are arranged, relative to the solar concentration cavity, so that each has a heater head disposed within the hot portion of the solar concentration cavity. As the thermal energy is used to power the Stirling engines, the cavity cools and the thermal energy is replenished by the collector.

During variations in insolation of the solar collection system, varying numbers of the Stirling engines can be cycled on and off to maintain a constant and optimum heating head temperature within the solar concentration cavity. Therefore, an optimum heater head temperature can be maintained for the operating Stirling engines to increase the efficiency of the system overall. Thus, during low insolation periods, a lower number of Stirling engines can be operated, while during higher insolation periods, more or all of the Stirling engines can be operated.

A first preferred embodiment of the present invention includes a power conversion system for converting thermal energy to electrical energy. The system includes a container defining a thermal cavity having a volume that is able to collect thermal energy. A plurality of engines are operably connected to the container such that the engines are able to use the collected thermal energy to perform work. A plurality of alternators are operably connected to at least one of the plurality of engines. An energy source provides energy to the thermal cavity. The plurality of engines are operated to control the temperature in the thermal cavity to optimize the operation of the power conversion system.

A second preferred embodiment of the present invention includes a solar energy to electricity conversion system. The system includes a solar collector and concentrator that collects and concentrates solar energy. A solar cavity including a thermal cavity is provided where the collected and concentrated solar energy creates thermal energy. A plurality of engines are operably connected to the thermal cavity such that the engines are able to use the thermal energy to perform work. The engines are operated to control the temperature in the thermal cavity to optimize the operation of the power conversion system. Finally, the work performed by the engines may be transformed into electricity.

A preferred method of the present invention involves converting solar energy to electricity with a solar collector and concentrator via a single solar cavity having a plurality of engines associated therewith. The method includes disposing a solar collector and concentrator in a position to collect and concentrate solar energy. The single solar cavity is arranged to receive the concentrated solar energy. Then at least a portion of the concentrated solar energy is converted to thermal energy in the single solar cavity. A plurality of engines are operably connected to the single solar cavity to use the thermal energy to perform work to ultimately create electricity.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although the following exemplary description describes a terrestrial power generation system using solar energy as the source of thermal energy, it will be understood that a non-terrestrial based system may also be formed. Furthermore, other sources of heat may be used within the scope of the present invention. In addition, although the following description relates specifically to the use of an engine using the Stirling cycle to convert thermal energy into electrical energy, it will be understood that various other engines or cycles can be used. Specifically, engines using various other cycles can be used with the systems described below include the Brayton cycle and the Rankine cycle. These, along with other cycles, can be formed into engines which use the thermal energy collected and concentrated according to the following invention to perform work to produce electricity. Therefore, it is understood that the following invention is not limited to the Stirling cycle or Stirling cycle engines.

Herein, it will be understood that different engines use different operating cycles; however, an engine may be referenced to by its cycle name alone. For example, an engine using the Stirling cycle may be referenced to as a Stirling engine.

Figure 1:
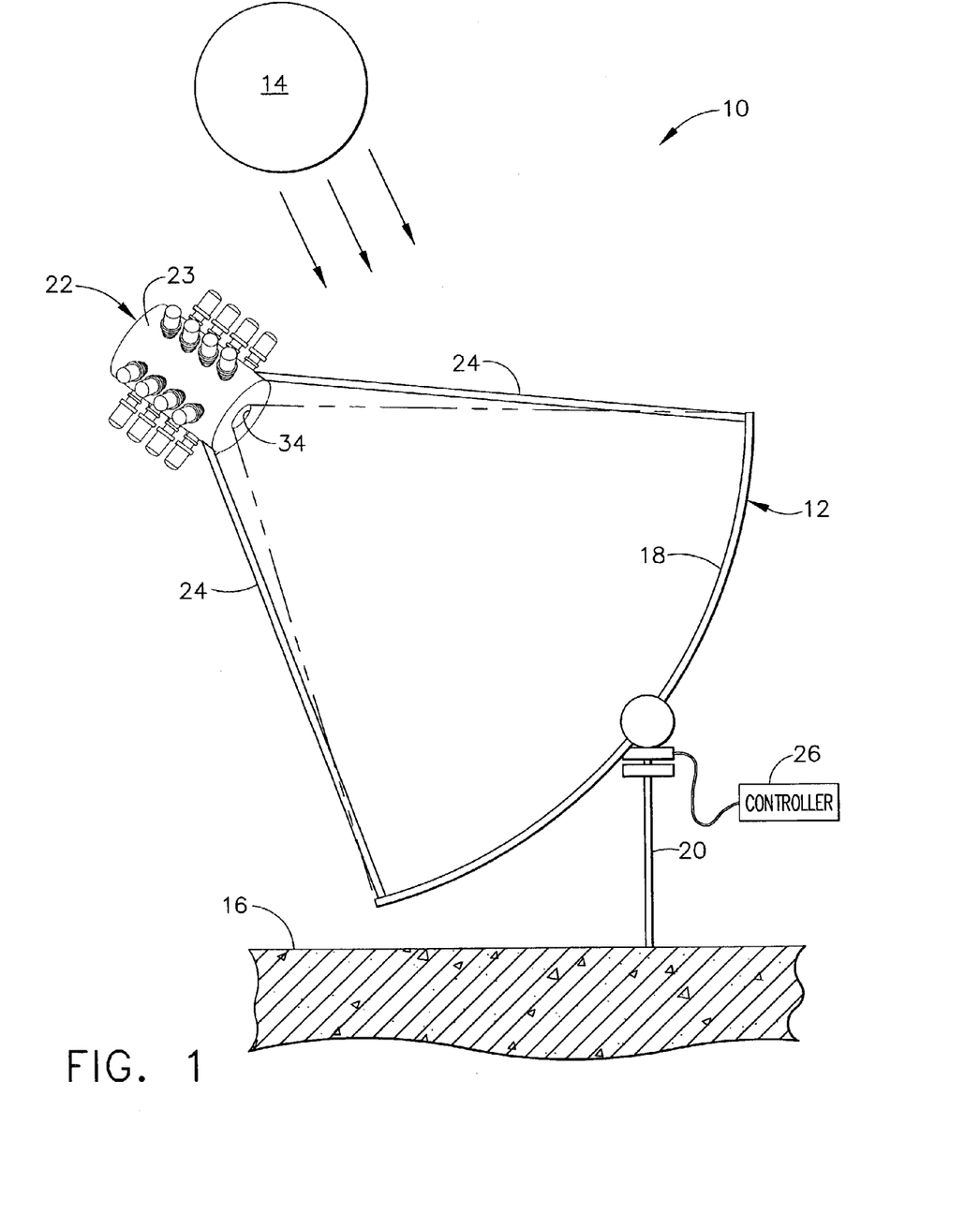
FIG. 1 is a simplified view of a solar collector and concentrator including a solar cavity and a plurality of Stirling cycle engines according to a first embodiment of the present invention.

With reference to FIG. 1, a power conversion system 10 in accordance with a preferred embodiment of the present invention is shown. The power conversion system 10 collects and concentrates solar energy to produce thermal energy to drive a plurality of Stirling engines 44 (illustrated in FIG. 2A). The power conversion system 10 includes a solar collector 12 that collects solar energy from the sun 14. Although the following description describes a terrestrial based system, where the solar collector 12 is placed on the earth 16, it will be understood that the power conversion system 10 may be used on an orbiting spacecraft or on other space going systems. The solar collector 12 generally consists of a concave mirror 18 that is placed on a movable or mobile stand 20. The concave mirror 18 focuses the collected solar energy to a particular point, which is generally an aperture of a collection cavity absorber or receiver 22, of a housing 23. The housing 23 may be an insulated container to minimize thermal radiation through the container.

The housing 23 is mounted such that the cavity 22 is positioned at the point where the solar energy is focused by the concave mirror 18. The housing 23 is movable with the mirror 18 via mounting struts 24. Therefore, the concave mirror 18 can be moved using the movable stand 20 and the cavity 22 always stays at the appropriate position relative to the concave mirror 18. In this way, the concave mirror 18 can be moved to provide the most efficient collection of solar energy while maintaining the focused solar energy on cavity 22.

The orientation of the concave mirror 18 on the stand 20 is controlled by a pointing controller 26 that measures the intensity and orientation of the solar energy from the sun 14. The pointing controller 26 is able to measure the intensity of insolation of a plurality of points and compare the insolation amongst these points. The pointing controller 26 may then instruct the stand 20 to orient the concave mirror 18 to the highest insolation point thereby providing the most efficient collection of solar energy. Therefore, as the earth 16 rotates, the concave mirror 18 can always be oriented to provide the most efficient and complete collection of available solar energy from the sun 14.

Figure 2A:
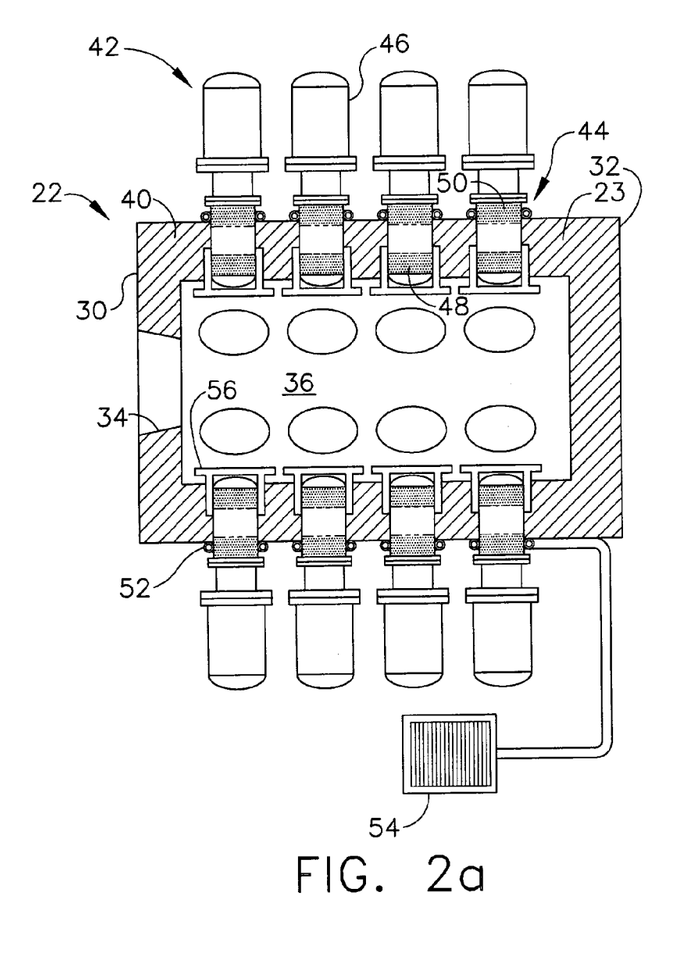
FIG. 2A is a partial cross-sectional detailed view of the solar cavity in FIG. 1.
Figure 2B:
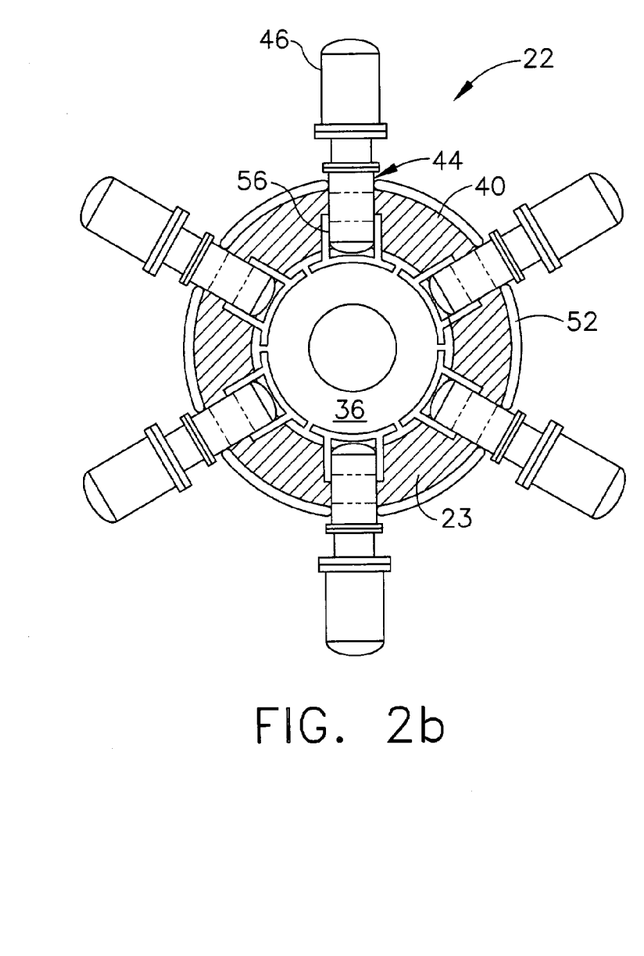
FIG. 2B is a detailed plan-view of the solar cavity illustrated in FIG. 1.

With reference to FIGS. 2A and 2B, the cavity 22 is defined by the housing or container 23 substantially defining a closed bottom cylinder. It will be understood that, although the container 23 is illustrated as a cylinder, other cross-sectional shapes may be used, such as for example, a hexagonal shape. The container 23 includes an inward collector side 30 and an outward side 32. Defined substantially at an axial center of the collector side 30 is a solar or energy input aperture 34. The solar aperture 34 allows the collected solar energy to be directed toward a thermal cavity 36 of the container 23. The container 23 may be formed of a material that will either collect and radiate thermal energy or that reflects the solar energy within the thermal cavity 36 to increase the temperature of the thermal cavity area 36. In this way, the thermal cavity 36 is heated due to the collection, concentration and absorption of solar energy within the thermal cavity 36. The mounting struts 24 may extend to the exterior surface of the solar cavity 36 and be attached thereto with suitable support structure to hold the cavity 22 in the predetermined orientation relative to the concave mirror 18.

Extending between the collector side 30 and the outward side 32 is a cavity wall 40. Extending from the cavity wall 40 are a plurality of Stirling engine/alternators 42. The Stirling engine/alternators 42 will be described herein, in conjunction with FIG. 3, in greater detail. Generally, however, each Stirling engine/alternator 42 includes a Stirling engine portion 44 and an alternator portion 46. The Stirling engine portion 44 includes a hot region 48 and a cool region 50. The hot region 48 is disposed substantially closer to the cavity 36 than the cool region 50. In this way, thermal energy can be shuttled from the thermal cavity 36 via the hot region 48 to the cool region 50. This transfer of thermal energy powers the Stirling engine 44.

Moreover, the cool region 50 of the Stirling engine 44 can either be air cooled or cooled with gas or liquid plumbing. In a plumbed fluid system, a coolant is driven through a plurality of tubes 52. The tubes 52 may be interconnected in parallel between each one of the plurality of the Stirling engines 44 and finally connected to a radiator 54 to allow efficient cooling of the cool regions 50 of the Stirling engines 44. It will be understood that any appropriate tube design may be used. The Stirling engines 44 may be mounted to the wall 40 of the container 23 using any appropriate means, but are generally held in place with mechanical fasteners 56.

With reference to FIGS. 2A and 2B, a plurality of the Stirling engines 44 are placed in the container 23. One preferred arrangement is six of the Stirling engines 44 spaced at equal radial distances and circumferential angles around a center axis of the container 23 to form a ring of engines (FIG. 2B). Four rows of these six Stirling engine 44 rings can then be stacked about the central axis of the container 23 (FIG. 2A). In this configuration, twenty-four of the Stirling engines 44 are disposed around the periphery of the single container 23. Therefore, the cavity 22 includes the central thermal cavity 36 which is surrounded by twenty-four of the Stirling engines 44. The several Stirling engines 44 use the thermal energy collected in the thermal cavity 36 to generate motive power. The motive power is, in turn, used to produce electrical power using the alternator provided in the alternator portion 46.

Figure 3:
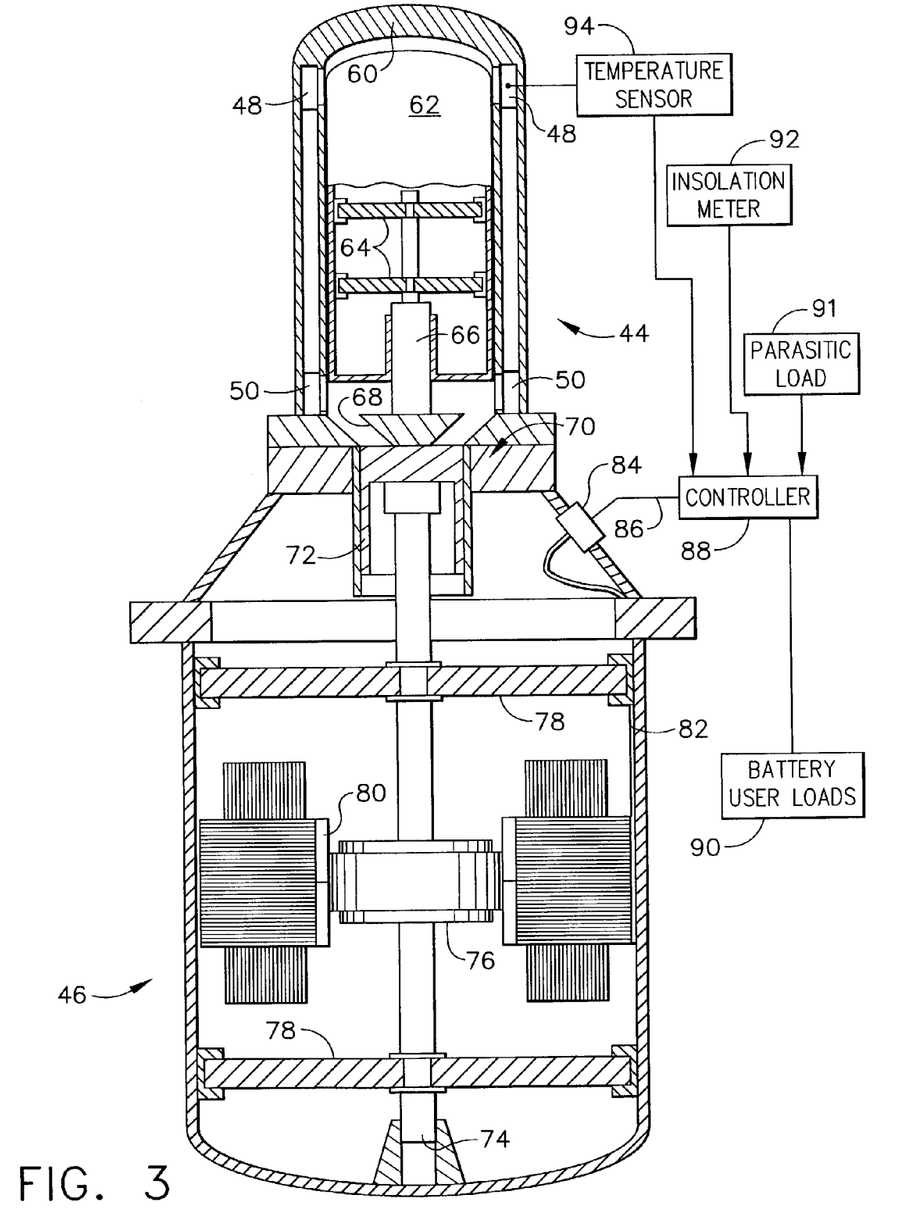
FIG. 3 is a cross-sectional schematic view of a Stirling cycle engine according to the present invention.

With reference to FIG. 3, an exemplary design for the Stirling engine 44 and an exemplary design for the alternator section 46 is illustrated. The Stirling engine 44 includes the hot region 48 and the cool region 50. The Stirling engine 44 and the alternator portion 46 are all contained within a substantially unitary and contiguous shell 60. The shell 60 substantially encloses the Stirling engine 44 and the alternator portion 46, thereby enclosing a predetermined and selected volume of gas. The shell 60 substantially seals the volume of gas, thereby preventing the contained gas from escaping or the admittance of any additional gas. The gases contained within the shell 60 are the gases that participate in the Stirling heat engine cycle 44.

Although the operation of the Stirling engine 44 is generally known in the art, a brief description will be provided. The shell 60 of the Stirling engine 44 encloses a volume of gas that is allowed to travel around a displacer piston 62. The displacer piston 62 is held within the Stirling engine 44 by a plurality of flexure bearings 64 that extend from a displacer rod 66. The flexure bearings 64 interconnect the displacer rod 66 that is fixed within the Stirling engine 44 and the interior walls of displacer piston 62. The flexure bearings 64 constrain the displacer piston 62 to move only axially along a central axis of the displacer rod 66 while preventing movement transverse to the central axis.

As the displacer piston 62 moves axially, it forces gases through a passage 68. As the gases are forced through the passage 68 they fill a compression space 70. A power piston 72 is contained within and substantially seals the compression space 70 and does not allow a significant volume of gas to pass the power piston 72. Therefore, substantially all of the force of the gas, which was forced into the compression space 70 by the displacer piston 62, is used to move the power piston 72.

The power piston 72 includes an alternator rod 74, wherein the alternator rod 74 includes a magnetic material 76. The alternator rod 74 extends into the alternator portion 46. The alternator rod 74 is held in place with alternator flexure bearings 78, similar to the flexure bearings 66 that hold the displacer piston 62. Therefore, the alternator rod 74 is constrained to move only axially within the alternator portion 46. As the Stirling engine 44 forces movement of the alternator rod 74, the magnetic material 76, fixed to the alternator rod 74, displaces the magnetic flux within a linear alternator coil 80. By doing this, an electromotive force is created within the linear alternator coil 80, that can then be transmitted through the load line 82. The load line 82 exits the shell 60 at an extraction port 84. A power line 86 transfers a portion of the power through a controller 88 and on to a storage unit such as a battery 90, or to an end user. The remaining portion of the power is retained by the controller in a parasitic load supply 91 as control authority in a parasitic load through which the motion of the power piston 72 can be adjusted by means of an adjustable parasitic load resistor. This can allow fine adjustment to the specific tuning of the optimum operating conditions of the Stirling engine 44.

The system 10 preferably includes a plurality of the Stirling engines 44 associated within one cavity 22. Moreover, each of the Stirling engines 44 can be independently controlled for stroke length of its power piston 72, and may also be completely turned "off". Therefore, the efficiency of the power conversion system 10 can be closely controlled because a plurality of the Stirling engines 44, each of which may be separately controlled, are provided with the cavity 22.

The Stirling engines 44 effectively move thermal energy from the thermal cavity 36 to the cool region 50 of the Stirling engine 44. Thermal energy is conducted from the cool region 50 to the cooling tubes 52 where it is absorbed, transported and subsequently radiated from the radiator 54. The cooling tubes may be situated in any appropriate fashion, but one generally in parallel. It is only the input of the solar energy from the concave mirror 18 that heats the thermal cavity 36. The collection of solar energy heats the thermal cavity 36 to provide the energy source required to operate the Stirling engine 44. In turn, this collected thermal energy heats the gases in the hot region 48 of the Stirling engine 44. The transfer of the gases due to the movement of the displacer piston 62 operates the power piston 72. A reduction in solar energy reduces the production of thermal energy, thereby cooling the thermal cavity 36, and the Stirling engines 44 will not operate optimally. Although solar energy is converted to thermal energy to drive the Stirling engines 44 in the present example, it will be understood that the cavity 22 may be joined with other thermal sources to provide thermal energy to the thermal cavity 36. For example, a carbon based fuel may be combusted to provide thermal energy to the thermal cavity 36.

The Stirling engine 44 can be optimized to run at a particular temperature of the heater head at the hot region 48. For example, the Stirling engine 44 may be tuned to operate optimally when the thermal cavity 36 provides a heater head temperature of about 590° C. to about 610° C. As long as the heater head is maintained in the optimum temperature range, the optimum efficiency of the Stirling engine 44 is maintained. However, if the thermal cavity 36 cools below this optimum temperature range, then the Stirling engine 44 will not operate at its optimum capacity and efficiency. Therefore, the overall efficiency of the power conversion system 10 is reduced. It will be understood that the Stirling engine can be tuned to any heater head temperature, for example, within a range of about 400° C. to about 800° C.

Providing more than one of the Stirling engines 44 allows any one or more of the Stirling engines 44 to be turned off. When turned off, a given Stirling engine is not operating to transport thermal energy from the thermal energy cavity 36 to the cooling region 50. This enables the optimal temperature of the thermal cavity 36 to be more easily maintained. Because the Stirling engine 44 cools the thermal cavity 36 by removing thermal energy from it, each of the operating Stirling engines 44 decrease the thermal energy available for each of the other operating Stirling engines 44. Therefore, turning off any one of the Stirling engines 44 increases the proportion of thermal energy remaining for the remaining operating Stirling engines 44. Accordingly, providing a plurality of the Stirling engine 44 provides a means to control and optimize the power conversion system 10 depending upon the amount of thermal energy available in the thermal cavity 36. Because the thermal energy in the thermal cavity 36 is provided from the insolation from the sun 14 through the concave mirror 18, variations in the insolation vary the amount of thermal energy in the thermal cavity 36.

The Stirling engine 44 can be turned "off" by the controller 88 by increasing the load on the linear alternator power windings 80 to substantially limit the motion of the alternator rod 74 to a very small range. This reduced movement of the displacer piston 62 prevents the efficient transfer of heat from the source heat exchanger to the sink heat exchanger within the Stirling engine 44. At this point, the Stirling engine 44 is substantially turned off. Therefore, the Stirling engine 44 is not draining much of the thermal energy that is collected in the thermal cavity 36. Because one of the Stirling engines 44 has been turned off, this allows a proportionally larger amount of the energy in the thermal cavity 36 to be provided to the remaining Stirling engines 44. Due to the design of the Stirling engine 44, there is minimal or no thermal energy loss around or through each Stirling engine 44 when it is turned off. Thus, the overall efficiency of the power conversion system 10 can be increased. Therefore, when operating with reduced solar flux, turning off a subplurality of the Stirling engines 44 maintains the temperature of the thermal cavity 36, and the thermal cavity 36 will remain at the optimum temperature for the operation of the remaining Stirling engines 44 that are operating. Therefore, one or more of the Stirling engines 44 is turned off and the remaining Stirling engines 44 remain operating within the optimum heater head temperature range.

An additional precision adjustment of each of the Stirling engines 44 can be performed by adjusting the stroke length of each. By increasing or decreasing the stroke length, the throughput of the Stirling engine 44 can be modified to help maintain a constant temperature in the thermal cavity 36. This allows each of the Stirling engines 44 to remain in an "on" condition, while altering the throughput and maintaining the optimum design efficiency of each engine. Controlling the stroke length can effectively change the optimum design ranges, plus or minus, by about 10% of the design range for each of the Stirling engines 44. Moreover, each of the Stirling engines 44 can be controlled independently of the others relative to stroke length. The stroke length may be varied by increasing or decreasing the electrical load placed on the linear alternator 80. One exemplary method of controlling the stroke length is described in commonly assigned U.S. patent application Ser. No. 10/431,690, U.S. Pat. No. 6,871,495, entitled "Thermal Cycle Engine Boost Bridge Power Interface", to Thomas H. Lynch and Brian Koch, which is hereby incorporated by reference. Generally, the controller as described in the above noted reference, includes programming steps or components to both determine a present stroke and temperature of the hot end 48 of the Stirling engine 44 and a stroke of the alternator 46. The controller 88 can adjust a current load placed on the alternator 46 to obtain a selected stroke and achieve the optimal temperature of the hot end 48. Therefore, without reiterating the complete disclosure, the controller 88 is able to determine or sense the harsh temperature and alter the operation of the Stirling engine 44 to obtain the optimal temperature to increase the efficiency of the system. Moreover, the controller 88 is able to alter the stroke of the alternator 46 and the Stirling engine 44 to achieve an optimal power transfer from the alternator 46 to the load 90. As described herein, additional loads, such as the parasitic load 91, may be placed on the alternator 96 to achieve the selected current load and selected stroke length.

The controller 88 is in communication with each of the Stirling engines 44 provided in the cavity 22. Therefore, controller 88 can independently control each of the Stirling engines 44 housed in the cavity 22. This allows the controller 88 to control the operation of each of the Stirling engines 44 independently of the others to insure an optimum heater head temperature within the thermal cavity 36, and also so that all of the Stirling engines 44 operate within their optimum ranges. The controller 88 can also detect the amount of insolation that is reaching the concave mirror 18 through a suitable external sensor 92. Therefore, the controller 88 can determine the amount of energy being provided to the cavity 22. Moreover, the controller 88 can determine the temperature of the thermal cavity 36 through a temperature sensor 94. Using this data, the power controller 88 can then determine the optimum number of the Stirling engines 44 that should be operating to maintain the optimum heater head temperature. The controller 88 also determines if altering the stroke length of any or all of the Stirling engines 44 is necessary to provide an optimum operational efficiency, and provides control signals to the engines as needed to modify the stroke length. The controller 88 thus determines the overall number of Stirling engines 44 that need to be operating in addition to the optimum stroke length to ensure optimum efficiency.

Under optimum atmospheric and environmental conditions, the power conversion system 10 provides enough thermal energy to the thermal cavity 36 to operate all of the provided Stirling engines 44 at their optimum efficiency. However, day-to-day and seasonal variations in environmental and atmospheric conditions can vary the amount of insolation that the concave mirror 18 is able to receive. At times of slightly decreased insolation, the controller 88 can alter the stroke length of each of the Stirling engines 44, or turn any or all of the Stirling engines 44 off, to maintain the appropriate heater head temperature within the thermal cavity 36. This way, the operating Stirling engines 44 are always operating at their optimum capacity. Therefore, over an annualized or extended period of time, the efficiency of the entire power conversion system 10 is optimized because of the ability of the power conversion system 10 to account for varying amounts of insolation, rather than simply allowing the thermal cavity 36 to cool below an optimum operating temperature and allowing the Stirling engines 44 to operate at sub-optimum conditions.

Although the number of Stirling engines 44, as well as the stroke length of each engine can be tailored to meet specific power generating needs, one preferred embodiment includes twenty-four of the Stirling engines 44 each having a one kilowatt output capacity. This allows for the generation of approximately 24 kilowatts of total energy when the power conversion system 10 is operating at peak capacity. Nevertheless, the output capacity each Stirling engine 44 can be in nearly any range, for example range from about 250 watts to at least five kilowatts.

The concave mirror 18 is formed with dimensions suitable to reflect the needed amount of solar energy to the single cavity 22 under optimal conditions. For the illustrated example involving the use of 24 of the Stirling engines 44, at about one kilowatt output apiece, the concave mirror 18 is approximately ten meters in diameter. Nevertheless, the mirror size and the cavity size 22 can be altered to readily accommodate mirrors up to about twenty meters or more. Again, the mirror size is principally determined by the size of the cavity 22 and other engineering concerns such as the wind force likely to be experienced by the mirror and the mass of the moving stand 20.

The power conversion system 10 allows for a controlled reduction of the power conversion capacity of the system 10 by providing a plurality of the Stirling engines 44 and allowing control over each of the Stirling engines 44. Each of the Stirling engines 44 can be controlled for stroke length or can be turned off completely depending upon varying insolation. Turning each of the Stirling engines 44 off accounts for a reduction in power conversion and thermal transfer ability by a factor of 1/N, where N is the total number of the operating Stirling engines 44. In the above-described example, each of the Stirling engines 44 that is turned off accounts for a reduction of $\frac{1}{24}$ of the rated power conversion and thermal transfer output capacity of the power conversion system 10. Obviously, providing a different number of the Stirling engines 44 will provide for a proportionally different degree of power conversion reduction.

By allowing for independent control over the output capacity, of each one of a plurality of Stirling engines 44 in a single solar cavity 22, one can increase the efficiency of the power conversion system 10 by about 50% over a system with only a single Stirling engine having an output capacity equal to the aggregate (i.e. overall) output capacity of the plurality of the Stirling engines 44 in the power conversion system 10. Therefore, the power conversion system 10 can be operated substantially continuously over an extended period of time without falling below its optimum operating parameters.

With data gained through operating experience, heat throughput can be adjusted in response to the signal from an insolation sensor 92 mounted on the concentrator 12. Instead of relying on a cavity temperature feed back signal from the temperature sensor 94 to adjust engine array configuration, the energy input rate change signaled by an insolation sensor 92 can be used to adjust engine array configuration. This allows maintaining the cavity 22 temperature through feed forward techniques that act faster than the cavity thermal time constant.

The description of the invention is merely exemplary in nature and, thus, variations that do not depart from the gist of the invention are intended to be within the scope of the invention. Such variations are not to be regarded as a departure from the spirit and scope of the invention. In particular, as mentioned above, various other engines using various other power conversion cycles may be incorporated into the present invention without departing from the scope thereof. For example, a Brayton cycle engine may be used in conjunction with the single solar cavity 22 such that one or more of a plurality of the Brayton cycle engines may be turned off to maintain the optimal operating conditions for each of the remaining operating Brayton cycle engines. Therefore, it will be understood, that the above-described invention can be used with a plurality of engines and power conversion cycles.

What is claimed is:

1. A method to convert solar energy to electricity with a solar collector and concentrator and a housing having a cavity wherein the cavity has associated therewith a plurality of engines, the method comprising:
    disposing said solar collector and concentrator in a position to collect and concentrate solar energy at a focus point;
    positioning said cavity to receive said concentrated solar energy;
    converting at least a portion of said solar energy to thermal energy in said cavity; and
    operably disposing said plurality of engines in substantially direct communication with said cavity to transmit thermal energy directly to said plurality of engines to use said thermal energy to generate electricity.

2. The method of claim 1, further comprising:
    positioning said solar collector and concentrator to collect and concentrate a maximum amount of said solar energy at said focus point; and
    positioning said housing relative to said solar collector and concentrator to ensure that said collected solar energy is provided to said cavity.

3. The method of claim 2, wherein positioning said solar collector and concentrator to collect and concentrate a maximum amount of solar energy, includes:
    mounting said solar collector and concentrator on a mobile platform;
    measuring an insolation at a plurality of points;
    selecting one of said plurality of points with the greatest insolation; and
    moving said mobile platform so that said solar collector and concentrator is at said point of greatest insolation.

4. The method of claim 1, wherein operably disposing said plurality of engines relative to said single solar cavity to use said thermal energy to generate electricity, includes:
    positioning a hot region of said engine in thermal communication with said cavity;
    positioning a cool region of said engine to allow said engine to use the thermal energy in said cavity to perform work; and
    using a plurality of alternators associated with said engines such that when said engine is operated said alternators produce electricity.

5. The method of 4, wherein each one of said plurality of said engines has an optimum operating condition including a temperature of said cavity, further comprising:
    controlling said alternators with a controller to control an electrical load placed on each said alternator; and
    increasing or decreasing the electrical load placed on each said alternator to vary an optimum operating efficiency of each said engine.

6. The method of claim 1, further comprising:
    turning off at least one of said engines for a period of time to maintain said cavity at an optimum, predetermined temperature; and
    wherein said engine is selected from a group consisting of Stirling cycle engines, Brayton cycle engines, Rankine cycle engines, or a combination thereof.

7. A method to convert solar enemy to electricity with a solar collector and concentrator and a housing having a cavity wherein the cavity has associated therewith a plurality of engines, the method comprising:
    disposing said solar collector and concentrator in a position to collect and concentrate solar energy at a focus point;
    positioning said cavity to receive said concentrated solar energy;
    converting at least a portion of said solar energy to thermal energy in said cavity; and
    turning off at least one of said engines for a period of time to maintain said cavity at an optimum, predetermined temperature.

8. A method for converting solar energy into electrical energy, comprising:
    using a mirror to receive and focus solar energy to a focus point;
    positioning a housing having a thermal cavity adjacent said mirror such that said thermal cavity is approximately disposed at said focus point;
    using a plurality of energy conversion engines disposed adjacent said thermal cavity to generate electricity from thermal energy generated within said thermal cavity; and
    controlling said energy conversion engines to maintain said thermal cavity at a predetermined temperature regardless of variations in said solar energy.

9. The method of claim 8, further comprising:
    determining a temperature of said thermal cavity;
    determining an optimum number of said energy conversion engines to operate at said determined temperature; and
    wherein controlling said energy conversion engines includes operating only said determined optimum number.

10. The method of claim 9, further comprising:
determining an insolation of said mirror;
determining an optimum number of aid energy conversion engines to operate at said determined insolation; and
wherein controlling said energy conversion engines includes operating only said determined optimum number.

11. The method of claim 9, where controlling said energy conversion engines includes selecting a stroke length of each energy conversion engine; and
selecting to operate or not operate each of said energy conversion engines.

* * * * *